United States Patent
Taylor et al.

(10) Patent No.: US 12,368,718 B2
(45) Date of Patent: Jul. 22, 2025

(54) RUNTIME CONFIGURATION OF AUTHENTICATION JOURNEYS

(71) Applicant: Ping Identity International, Inc., Denver, CO (US)

(72) Inventors: Isaac Taylor, Bristol (GB); Volker Gunnar Scheuber Heinz, Georgetown, TX (US); Charles Bailey, Bath (GB); Abel Jay Bowers, Bristol (GB); Thomas James Dennis, Bristol (GB); Kajetan Hemzaczek, Bristol (GB)

(73) Assignee: Ping Identity International, Inc., Denver, CO (US)

( * ) Notice: Subject to any disclaimer, the term of this patent is extended or adjusted under 35 U.S.C. 154(b) by 413 days.

(21) Appl. No.: 17/958,208

(22) Filed: Sep. 30, 2022

(65) Prior Publication Data
US 2024/0114031 A1    Apr. 4, 2024

(51) Int. Cl.
*H04L 9/40* (2022.01)

(52) U.S. Cl.
CPC ........ *H04L 63/102* (2013.01); *H04L 63/0884* (2013.01); *H04L 63/105* (2013.01)

(58) Field of Classification Search
CPC . H04L 63/102; H04L 63/0884; H04L 63/105; H04L 63/08
See application file for complete search history.

(56) References Cited

U.S. PATENT DOCUMENTS

| | | | |
|---|---|---|---|
| 6,633,898 B1 | 10/2003 | Seguchi et al. | |
| 7,865,931 B1 | 1/2011 | Stone et al. | |
| 8,751,941 B1 | 6/2014 | Kaushik et al. | |
| 8,931,055 B2 | 1/2015 | Shea et al. | |
| 8,978,114 B1 | 3/2015 | Kaushik et al. | |
| 9,720,750 B1 | 8/2017 | Abrams et al. | |
| 10,265,694 B2 | 4/2019 | Aizenberg et al. | |

(Continued)

FOREIGN PATENT DOCUMENTS

| CN | 101951375 A | 1/2011 |
|---|---|---|
| JP | H1049443 A | 2/1998 |

(Continued)

OTHER PUBLICATIONS

Behavioral Biometrics for Mobile, BioCatch, 2021, 3 pages (retrieved Dec. 14, 2021 from https://www.biocatch.com/hubfs/New%20Boilerplate/BC%20SB%20Mobile%20Data%20v6%20NBP.pdf).

(Continued)

*Primary Examiner* — Matthew T Henning

(57) ABSTRACT

The disclosed technology teaches a method for customers of an organization to perform configuration at runtime for authentication journeys used by the customer's users, to simplify authentication trees, and to delegate configuration to the customer's administrators, wherein an authentication tree implements an authentication journey, the authentication tree including authentication nodes and edges connecting the authentication nodes. The method includes configuring an editable script and an authentication node used in the authentication tree in response to a user invocation of the authentication journey by executing a factory method that applies configuration parameters to the editable script and to parameters used to access an API.

23 Claims, 9 Drawing Sheets

(56) References Cited

U.S. PATENT DOCUMENTS

| | | | |
|---|---|---|---|
| 10,303,576 | B1 | 5/2019 | Seymour et al. |
| 10,333,918 | B2 | 6/2019 | Kruse |
| 10,630,501 | B2 | 4/2020 | Ansari et al. |
| 10,681,055 | B2 | 6/2020 | Thexton et al. |
| 10,686,795 | B2 | 6/2020 | Thexton et al. |
| 10,686,885 | B2 | 6/2020 | Goyal et al. |
| 10,705,808 | B2 | 7/2020 | Chiosi et al. |
| 10,817,346 | B1 | 10/2020 | Culp et al. |
| 10,922,284 | B1 | 2/2021 | Venkatasubramanian et al. |
| 10,938,940 | B2 | 3/2021 | Alla |
| 11,075,791 | B2 | 7/2021 | Prathipati et al. |
| 11,347,560 | B2 | 5/2022 | Culp et al. |
| 11,777,992 | B1 | 10/2023 | Cross et al. |
| 2007/0214497 | A1 | 9/2007 | Montgomery |
| 2010/0199346 | A1 | 8/2010 | Ling et al. |
| 2013/0047229 | A1 | 2/2013 | Hoefel |
| 2013/0212387 | A1* | 8/2013 | Oberheide ............... H04L 9/32 713/168 |
| 2014/0165193 | A1 | 6/2014 | El-Rafei et al. |
| 2014/0316797 | A1 | 10/2014 | Biernacki et al. |
| 2015/0033292 | A1 | 1/2015 | Nguyen et al. |
| 2015/0067889 | A1 | 3/2015 | Baikalov et al. |
| 2015/0135305 | A1 | 5/2015 | Cabrera et al. |
| 2015/0205708 | A1 | 7/2015 | Michelsen |
| 2017/0093871 | A1 | 3/2017 | Abuelsaad et al. |
| 2017/0295062 | A1 | 10/2017 | Tang |
| 2018/0088982 | A1 | 3/2018 | Abrams et al. |
| 2018/0197128 | A1 | 7/2018 | Carstens et al. |
| 2019/0356693 | A1 | 11/2019 | Cahana et al. |
| 2019/0384662 | A1 | 12/2019 | Bonnell |
| 2019/0391897 | A1 | 12/2019 | Vijendra et al. |
| 2020/0034254 | A1 | 1/2020 | Natanzon |
| 2020/0073655 | A1 | 3/2020 | Park et al. |
| 2020/0136987 | A1 | 4/2020 | Nakfour |
| 2020/0280517 | A1 | 9/2020 | Kwon et al. |
| 2021/0004253 | A1 | 1/2021 | Barnes et al. |
| 2021/0072966 | A1 | 3/2021 | Zong et al. |
| 2021/0082575 | A1 | 3/2021 | Ji et al. |
| 2021/0173940 | A1 | 6/2021 | Mylrea et al. |
| 2021/0400075 | A1 | 12/2021 | Stergioudis et al. |
| 2022/0030036 | A1 | 1/2022 | Cirelli et al. |
| 2022/0070201 | A1 | 3/2022 | Almaz et al. |
| 2022/0191247 | A1 | 6/2022 | Dhoble et al. |

FOREIGN PATENT DOCUMENTS

| | | | |
|---|---|---|---|
| JP | 2003162612 | A | 6/2003 |
| JP | 2003216497 | A | 7/2003 |
| JP | 2004054732 | A | 2/2004 |
| JP | 2006073003 | A | 3/2006 |
| JP | 2012073812 | A | 4/2012 |
| JP | 2016051460 | A | 4/2016 |
| JP | 2016181158 | A | 10/2016 |

OTHER PUBLICATIONS

Innovating the Customer Experience Without Opening Fraud Floodgates, BioCatch, 10 pages (retrieved Dec. 14, 2021 from https://www.biocatch.com/hubfs/WP-Innovate-Customer-Experience-Without-Fraud.pdf).
Threat Matrix Guide, ID Dataweb, 7 pages (retrieved Dec. 14, 2021 from https://docs.iddataweb.com/docs/threatmetrix-1).
Cichonski et al., "Computer Security Incident Handling Guide", National Institute of Standards and Technology, U.S. Department of Commerce, Special Publication 800-61, Revision 2, http://dx.doi.org/10.6028/NIST.SP.800-61r2, Gaithersburg, MD, 2012, 79 pages.
"Hardening your cluster's security", Kubernetes Engine, (https://cloud.google.com/kubernetes-engine/docs/concepts/security-overview), Jul. 2019, 10 pages.
Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.
"Configuring Vertical Pod Autoscaling", Kubernetes Engine, Google Cloud (https://cloud.google.com/kubernetes-engine/), Aug. 14, 2019, 8 pages.
Wilkin, "Kubernetes Deployment Dependencies", https://medium.com/google-cloud/kubernetes-deployment-dependencies-ef703e563956, Jul. 2, 2018, 21 pages.
"Vertical Pod Autoscaling", Kubernetes Engine, https://cloud.google.com/kubernetes-engine/docs/concepts/verticalpodautoscaler), Aug. 29, 2019, 8 pages.
Sakimura et al, "OpenID Connect Dynamic Client Registration 1.0 incorporating errata set 1", https://openid.net/specs/openid-connect-registration-1_0.html, Oct. 1, 2019, 19 pages.
Jayanandana, "Enable Rolling updates in Kubernetes with Zero downtime", https://medium.com/platformer-blog/enable-rolling-updates-in-kubernetes-with-zero-downtime-31d7ec.388c81, Sep. 27, 2018, 6 pages.
"FAQ: IDM/OpenIDM performance and tuning", https://backstage.forgerock.com/knowledge/kb/article/a32504603, Jun. 26, 2019, 7 pages.
Amazon; AWS Elastic Beanstalk Developer Guide; Aug. 2019; 924 pgs (https://web.archive.org/web/20190805110626/https:// docs.aws.amazon.com/elasticbeanstalk/latest/dg/awseb-dg.pdf).
Amazon; AWS Elastic Beanstalk Developer Guide API version Dec. 1, 2012 dated Nov. 14, 2016, 965 pgs. [downloaded Aug. 9, 2023 from https://web.archive.org/web/20161114152137/https://docs.aws.amazon.com/elasticbeanstalk/latest/dg/awseb-dg.pdf].
AU 2019201186—Examination Report No. 1, dated Oct. 15, 2019, 8 pages.
AU 2019201186—Examination Report No. 2, dated May 5, 2020, 4 pages.
AU 2019201186—Examination Report No. 3, dated Oct. 6, 2020, 4 pages.
JP 2019-027807—Search Report dated Feb. 27, 2020, 63 pages.
JP 2019-027807—Notice of Reasons for Refusal dated Mar. 24, 2020, 8 pages.
JP 2019-027807—Response to Notice of Reasons for Refusal dated Sep. 24, 2020, 13 pages.
JP 2019-027807—Written Opinion dated Sep. 24, 2020, 9 pages.
JP 2019-027807—Notice of Reasons for Refusal dated Mar. 9, 2021, 6 pages.
JP 2019-027807—Response to Notice of Reasons for Refusal dated Sep. 7, 2021, 13 pages.
JP 2019-027807—Written Opinion dated Sep. 7, 2021, 4 pages.
JP 2019-027807—Decision to Grant a Patent dated Nov. 2, 2021, 6 pages.
JP 2021-194612—Decision to Grant a Patent dated Jan. 10, 2023, 5 pages.
AU 2019201186—Response to Examination Report No. 1, dated Apr. 9, 2020, 10 pages.
AU 2019201186—Response to Examination Report No. 2, dated Sep. 14, 2020, 8 pages.
AU 2020256320—Examination Report No. 1, dated Nov. 8, 2021, 6 pages.
AU 2020256320—Response to Examination Report No. 1, dated Jun. 29, 2022, 62 pages.
AU 2020256320—Examination Report No. 2, dated Jul. 20, 2022, 4 pages.
AU 2022268298—Examination Report No. 1, dated Sep. 12, 2023, 4 pages.
"Authentication nodes configuration reference", ForgeRock Identity Cloud Docs, accessed on May 12, 2022, 133 pages.
U.S. Appl. No. 16/579,740, filed Sep. 23, 2019, U.S. Pat. No. 10,817,346, Oct. 27, 2020, Issued.
U.S. Appl. No. 17/068,653, filed Oct. 12, 2020, U.S. Pat. No. 11,347,560, May 31, 2022, Issued.
U.S. Appl. No. 17/550,916, filed Dec. 14, 2021, U.S. Pat. No. 11,720,410, Aug. 8, 2023, Issued.
U.S. Appl. No. 18/231,160, filed Aug. 7, 2023, Abandoned.
U.S. Appl. No. 15/900,475, filed Feb. 20, 2018, U.S. Pat. No. 10,708,274, Jul. 7, 2020, Issued.

(56) References Cited

OTHER PUBLICATIONS

U.S. Appl. No. 16/016,154, filed Jun. 22, 2018, U.S. Pat. No. 10,676,795, Jun. 16, 2020, Issued.
U.S. Appl. No. 16/581,087, filed Sep. 24, 2019, U.S. Pat. No. 10,681,055, Jun. 9, 2020, Issued.
U.S. Appl. No. 16/906,953, filed Jun. 19, 2020, U.S. Pat. No. 11,128,635, Sep. 21, 2021, Issued.
U.S. Appl. No. 17/673,692, filed Feb. 16, 2022, U.S. Pat. No. 12,015,614, Jun. 18, 2024, Issued.
2019201186, Feb. 20, 2019, AU 2019201186 A1, Sep. 5, 2019, Published.
201927807, Feb. 19, 2019, JP 6,987,087 B2, Dec. 2, 2021, Issued.
2020256320, Feb. 20, 2019, AU 2020256320 A1, Nov. 12, 2020, Published.
2021194612, Nov. 30, 2021, JP 7,219,325 B2, Feb. 7, 2023, Issued.
2022268298, Nov. 8, 2022, AU 2022268298 A1, Dec. 15, 2022, Published.

\* cited by examiner

RUNTIME CONFIGURATION OF AUTHENTICATION JOURNEYS

RELATED APPLICATION

This application is related to U.S. application Ser. No. 17/673,692 titled "Authentication and Access Management for Heterogeneous Sources of Anomaly Detection Data," filed 16 Feb. 2022 which is incorporated by reference herein for all purposes.

FIELD OF INVENTION

The technology disclosed relates generally to processes or apparatus for increasing a system's extension of protection of system hardware, software, or data from maliciously caused destruction, unauthorized modification, or unauthorized disclosure. The technology disclosed more specifically relates to the runtime configuration of authentication journeys used by an enterprise to reduce the risk of unauthorized access, decrease the computational cost of authentication journeys, and delegate the configuration of authentication journeys to the customer's security administrators.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Security access can be modeled by an authentication journey. A set of alternative journeys to an online location can be modeled by a tree of authentication journeys—also known as an "authentication tree." For a single platform, or an organization hosting platforms used by few customers, authentication management may not be too complex to manage.

Platform security management may be magnitudes more complex as the number of customers grow, and statically configured nodes used in a custom journey for each customer does not easily scale.

For example, maintainability is difficult. If an urgent security update regarding SAML login must be sent, it is difficult to identify and manage the effects the login would have on the custom journeys without the security team individually testing each individual journey. That could be somewhat mitigated by delegating administration of custom nodes to the specific customer, but since the nodes are statically configured, that raises additional concerns about how multiple administrators could properly configure their nodes to work in a consistent way with the platform security architecture.

An opportunity arises for delegating administration to a customer for authentication journeys. An opportunity arises for flexible customization, such that it is easy to configure customized authentication journeys at runtime/authentication-time, or support legacy systems.

BRIEF DESCRIPTION OF DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
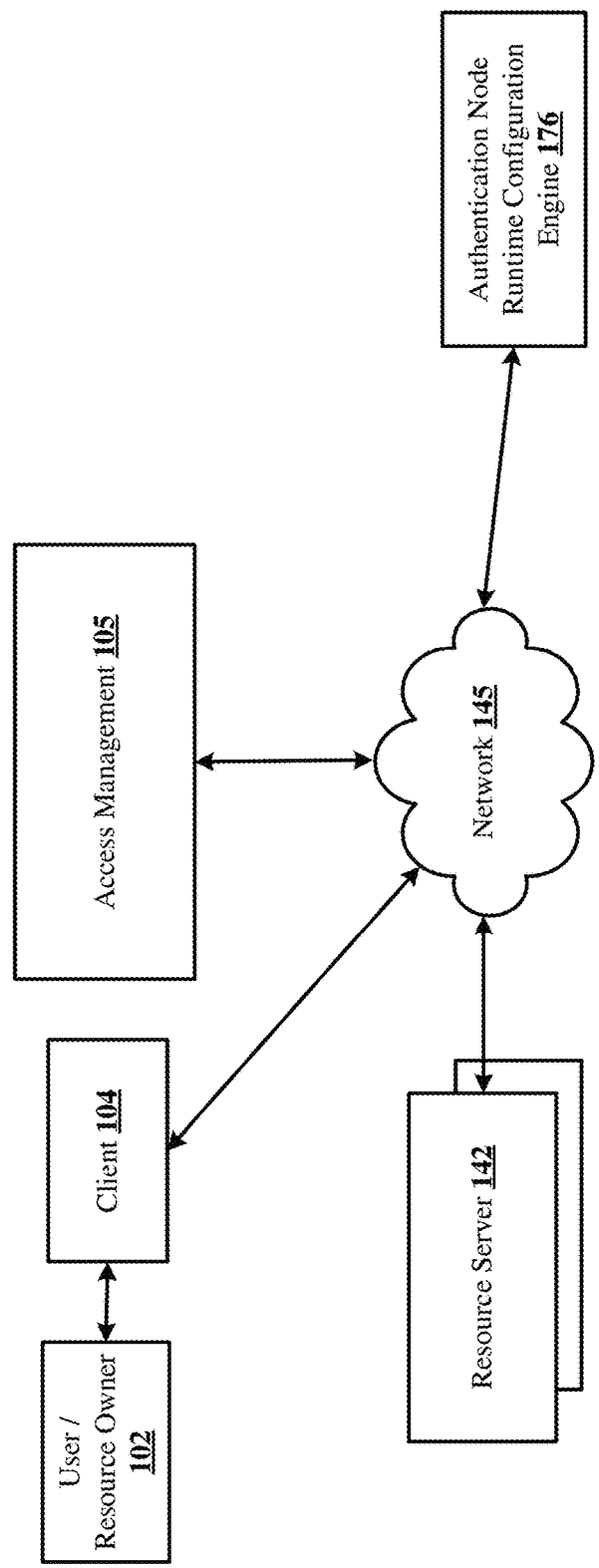
FIG. 1 shows an architectural level diagram of a system for runtime configuration of authentication journeys, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

INTRODUCTION

Cloud-based services allow users to securely access a plurality of applications and platforms via one or more factors of authentication. Similarly, enterprises authenticate and authorize their users before permitting the users to access company resources in an on-premises installation. Access management and authentication of a user via multi-factor authentication (MFA) is increasingly becoming the norm.

The MFA process can be described in a so-called authentication journey (in contrast to a simple login process) that encompasses numerous stages involved in the authentication of a user. These authentication journeys frequently access a plurality of independent anomaly detection data sources. The available anomaly data is fluid as the alternative sources advance their development of authentication metrics. A prior implementation of authentication journeys by Applicant included aggregation of $3^{rd}$-party risk measures for an authentication journey in authentication trees (disclosed in US Patent Pub. No. US-2022-0263833-A1, assigned to Applicant).

Authentication trees, composed of authentication nodes and edge connections, support single sign-on or aggregated access to multiple cloud-based resources for a user. Many methods of authentication require a user to authenticate separately for each individual cloud-based service. This practice leads to security risks such as re-using passwords and the use of simple, less-secure passwords. In contrast, the use of authentication trees allows users to access a plurality of cloud-based services within a single authentication journey. Frequently, a scenario arises for an enterprise in which a given user has multiple Identity Providers (IDP) to authenticate with, sometimes several hundred. Moreover, it may not be possible to know prior to invocation of the authentication journey which IDP the given user is registered with (e.g., the user's email address may be required as input to determine which IDP to use). In a static authentication tree, the described scenario requires at least one node for each IDP. The given user's authentication journey may also depend on additional access details, such as the particular resource to be accessed or the authorization level for the particular resource. In a static authentication tree, the described scenario additionally requires at least one scripted decision node for each inner tree journey. As with IDP nodes, the branching that occurs within an inner tree could span several hundreds of nodes.

Without a system for allowing dynamic configuration of a node, the workflow requires numerous nodes and has a complex branching mechanism to direct the journey to a specific node with the desired functionality. The resulting static authentication journeys are simultaneously limited in use-case scope and computationally complex, decreasing the speed and accuracy of authentication and access management. The disclosed technology can refine personalization of authentication journeys and thus, improve access security for users within an enterprise.

The disclosed technology provides runtime configuration of authentication journeys. Authentication nodes and authentication connections are dynamically configured in response to user invocation of an authentication journey. In comparison to a static authentication tree, the Applicant discloses a novel authentication tree workflow, using a factory method to dynamically configure authentication node(s). Dynamically configured nodes can respond to user input by switching between alternative connections. As used herein, "dynamically-configurable" refers to the runtime configuration of an authentication node, authentication connection, or authentication journey such that the configuration of an authentication journey or a structural or functional component within the authentication journey is re-configured during the runtime of an authentication tree in response to a particular stimulus, e.g., the user's organization or input to a prior authentication node. Furthermore, the term "runtime" refers to configuration responsive to a user invocation of the authentication journey. The runtime configuration can be saved in a cache to be accessed in future invocations of the authentication journey for the user. Alternatively, if the runtime configuration is not cached, runtime configuration can take place each time a user invokes the authentication journey.

The dynamically-configurable authentication node can modify the switching of nested authentication trees within a larger authentication tree and reduce the duplication of the same types of authentication nodes with varying configurations. Decreasing computational cost and increasing the functionality breadth of the authentication tree also decreases security risk relative to a static authentication tree. The use case-specific dynamic configuration of authentication trees in response to user input reduces the risk of unauthorized access due to situationally-inappropriate authentication tree configuration or loopholes introduced by out-of-date nodes.

As a user traverses the authentication nodes within the authentication tree, alternative connections are configured.

In some implementations, the factory method applies configuration parameters to legacy nodes or workflows, without little or no need to modify the legacy code, thereby leveraging an existing code base.

Turning to nomenclature, as used herein, an "organization" refers to an identity and access management provider and a "customer" refers to a particular enterprise implementing an identity and access management system provided by the organization. The disclosed method for customers of an organization to dynamically configure authentication journeys used by the customer's users (and thereby simplify authentication trees and delegate configuration of the authentication trees to the customer's administrators) via implementation of an authentication tree with runtime configuration capability comprises the execution of a factory method that applies configuration parameters to an editable script and parameters used to access cloud-based services (e.g., APIs and GUIs). The configuration parameters guide dynamic configuration of at least one field used by an authentication node in the authentication tree. The disclosed method of configuring nodes within an authentication tree is described synonymously herein as both "dynamic" and "runtime", such that each term respectively refers to the configuration of a particular node during an active authentication journey in a manner wherein an alternative connection configuration is loaded into the authentication tree in response to user input from a preceding authentication node parent. Configuration parameters for the factory method are stored in a parameter data structure that stores a set of configurations for authentication nodes. In response to a user invocation of the authentication journey, the editable script dynamically configures at least one authentication node accessing a particular API within the authentication tree.

Architecture

FIG. 1 shows an architectural level diagram of a system 100 for runtime configuration of authentication journeys, according to one embodiment of the disclosed technology. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes user/resource owner 102 who interacts with client 104 via computers, tablets, cell phones and smart watches. Browser-based applications and third-party applications can also be delivered on additional devices not mentioned here. System 100 also includes access management 105, a trusted authority that responds to requests for access. System 100 also has resource server 142 that handles authenticated requests from apps, also referred to as client 104 herein, and network 145 which can be a public network or a private network, in different implementations. System 100 can include multiple applications and multiple resource servers. Browser-based applications and third-party applications communicate with access management 105 and resource server 142 via posted messages.

System 100 also has an Authentication Node Runtime Configuration Engine 176 that is constructed to allow customers of an organization to dynamically configure authentication journeys used by the customer's users, to simplify authentication trees, and to delegate configuration to the customer's administrators.

In the interconnection of the elements of system 100, network 145 couples user/resource owner 102 on computer, tablet, cell phone, smart watch, with access management 105 and Authentication Node Runtime Configuration Engine 176. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi, and WiMAX.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Figure 2:
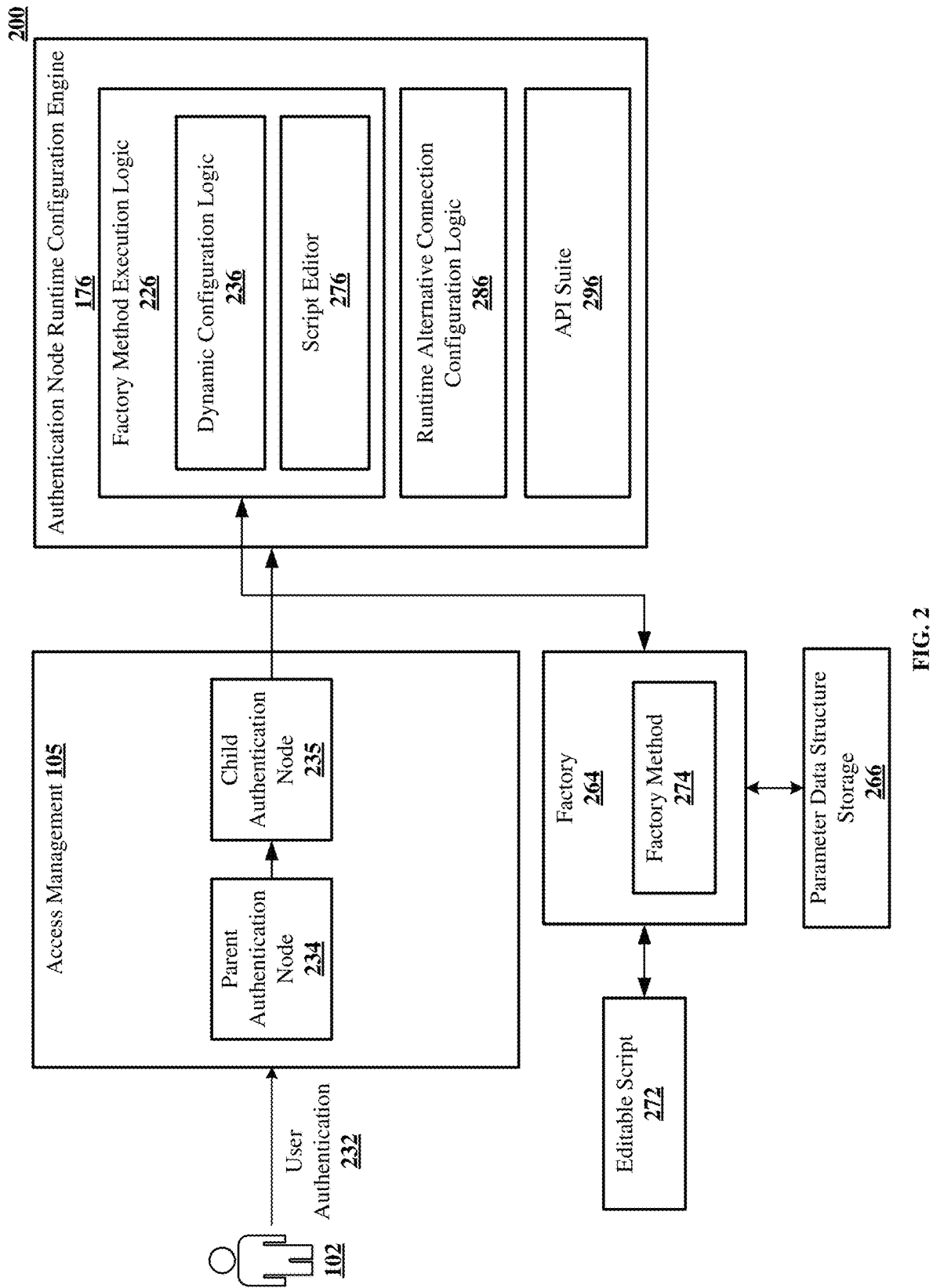
FIG. 2 shows a block diagram of a system for runtime configuration of authentication journeys, according to one embodiment of the disclosed technology.

FIG. 2 shows a block diagram of a system for runtime configuration of authentication journeys, according to one embodiment of the disclosed technology. A journey as used in this document, is an end-to-end workflow, also referred to as an authentication tree and as a directed graph, invoked by an end user or device. Common journeys are account registration and sign-in, for example. User/resource owner 102 transmits a request to authenticate to access management 105, as user authentication 232. Access management 105 with access management journey has configured parent authentication node 234 and child authentication node 235. Configuration of child authentication node 235 (by Authentication Node Runtime Configuration Engine 176) is dynamic in response to a user invocation of the parent authentication node 234. In one implementation of the disclosed method, child authentication node 235 implements or customizes at least one API within API suite 296.

Continuing the description of block diagram 200, Authentication Node Runtime Configuration Engine 176 allows customers of an organization to dynamically configure authentication journeys used by the customer's users, simplify authentication trees, and delegate configuration to the customer's administrators. In contrast to a static authentication tree configuration comprising authentication node configurations that must be set to a static value at the point of creation of the user authentication journey, Authentication Node Runtime Configuration Engine 176 allows a journey author to write a script to dynamically evaluate the configuration that a node expects during the execution of the user authentication journey, using information previously gathered as part of the tree execution to make decisions on configuring the node. Authentication Node Runtime Configuration Engine 176 utilizes disclosed functional blocks: a factory method execution logic 226, a runtime alternative connection configuration logic 286, and an API suite 296.

Factory method execution logic 226 comprises a dynamic configuration logic 236 and script editor 276. Factory method 274, implemented by factory 264, is instigated by factory method execution logic 226. Factory 264 is an object that carries out factory method 274 as a subroutine that returns a new object without having to specify the exact class of the object to be created, such as configuring new alternative connections in an authentication tree. Dynamic configuration logic 236 dynamically configures at least one configuration parameter used by child authentication node 235 to access an API. A user skilled in the art will recognize that the authentication tree can be configured to access a variety of software frameworks such as an SDK or GUI. Configuration parameters such as IDP entity IDs, single logout enabling Boolean variables, and SAML binding requests/responses are stored within parameter data structure storage 266. The configuration parameters listed are given explicitly as examples. A person skilled in the art will recognize that a plurality of configuration parameters may be implemented within an authentication journey for various authentication methods. Script editor 276 applies configuration parameters to the editable script 272, resulting in factory method 274 configuring editable script 272 to switch among alternative connections to alternative authentication nodes within the authentication tree as determined by at least one applied configuration parameter obtained from parameter data structure storage 266. The editable script 272 is responsible for dynamically configuring an authentication node 235 to meet the expected function during the execution of authentication tree using information previously gathered as part of the tree execution to make decisions on configuring the node. Alternative connections among authentication nodes in the authentication tree represent alternatives of authentication methods, alternative registration, or alternative branding.

Figure 3:
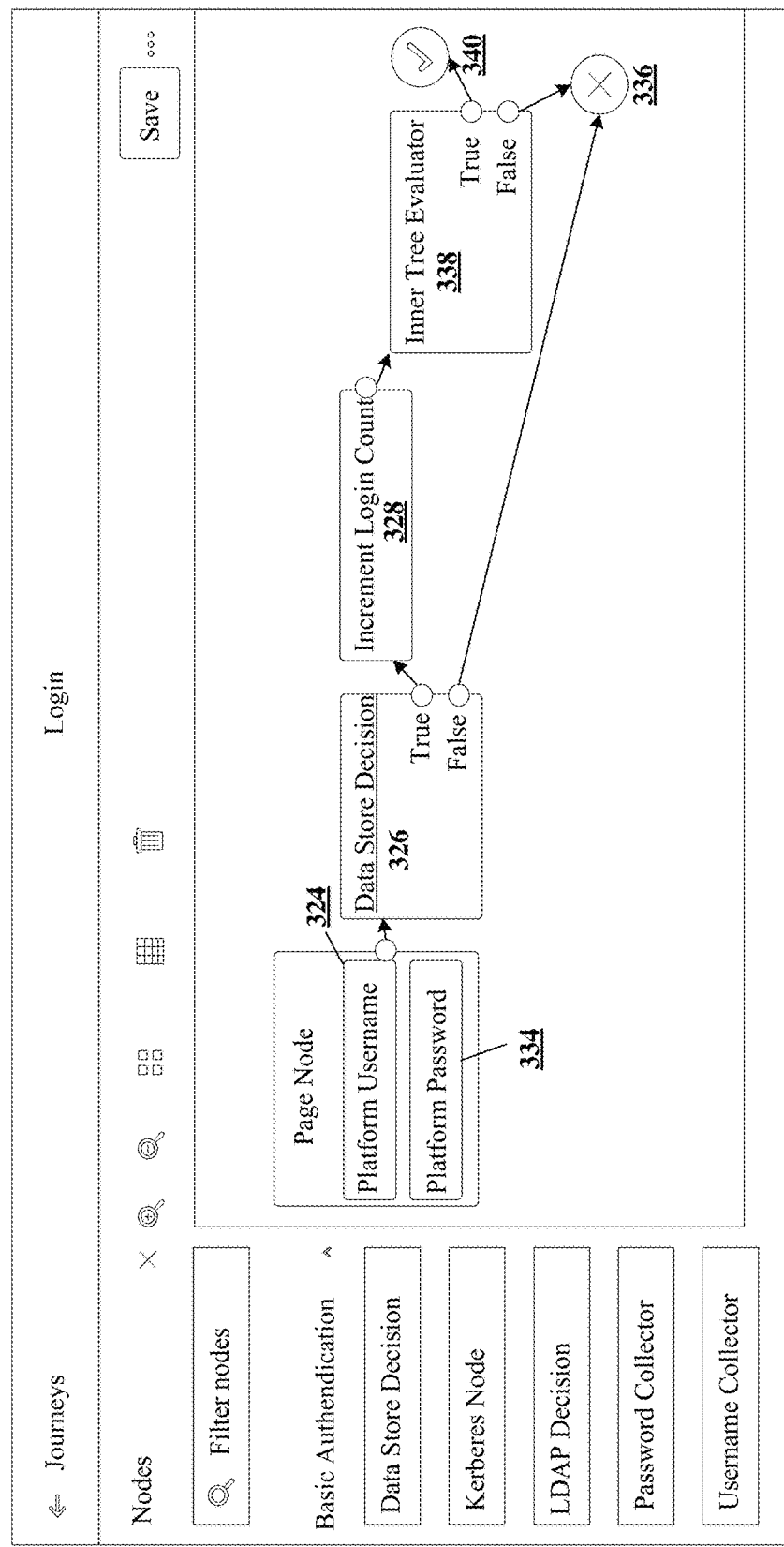
FIG. 3 shows key elements of a user authentication journey, via an example interface for configuring the nodes of an authentication journey.

Next, a simple authentication tree configuration is described. FIG. 3 shows an example authentication tree configured within a graphical user interface 300. This example journey for user authentication starts with a user providing username 324 and password 334. The next step after collecting the username and password information happens in the Data Store Decision 326 node of the authentication journey. If the result of the data store decision 326 is true, then the path of the journey goes next to increment login count 328. If the data store decision 326 results in a false, this is represented in the journey by the X 336 and the journey continues to inner tree evaluator 338. If the result of the inner tree evaluator 338 is true, then the path of the journey achieves successful authentication represented by the checkmark 340. If the inner tree evaluator 338 results in a false, this is represented in the journey by the X 336.

Ecosystem

The discussion now turns to a description of a potential ecosystem and associated use cases for the implementation of system 100.

Figure 4:
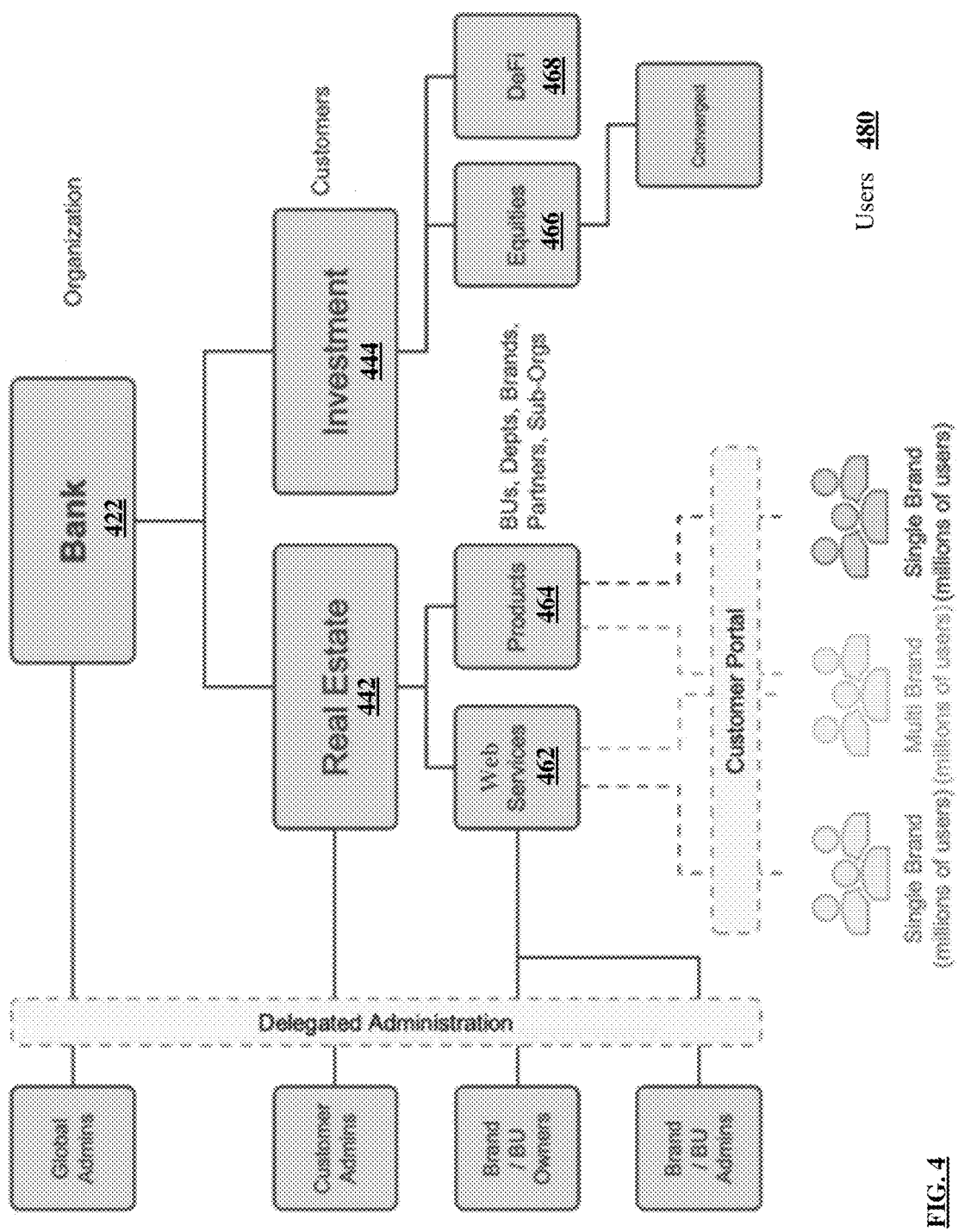
FIG. 4 illustrates a schematic diagram of an example ecosystem for the implementation of authentication journeys for an organization with a plurality of customers.

FIG. 4 illustrates a schematic diagram of an example ecosystem 400 for the implementation of authentication journeys for an organization with a plurality of customers. An organization such as a bank 422 has a plurality of customers, including a real estate customer 442 and an investment customer 444. Customers may have one or more suborganizations, departments, or brands such as services 462 and products 464 within the real estate customer 442 or equities 466 and decentralized finance 468 within the investment customer 444. At each level within the multi-tenancy hierarchy 400, administration is delegated to global administrators within the root organization, customer administrators, or brand administrators. In addition to a multi-tenant structure, the ecosystem shown may also comprise single brand or multi-brand customer portals, wherein each brand may comprise millions of users 480.

In certain embodiments of the disclosed method, a customer may have multiple IDPs that a given user may use to authenticate with, sometimes several hundred. It might not be possible to know when the user begins their journey which IDP the user is registered with (e.g., receiving input from the user with an email address or user ID may be necessary to determine which IDP to use). In the absence of the disclosed method for dynamic configuration of authentication nodes, each IDP will require its own authentication node. Moreover, without dynamic configuration, individual brands and registration methods will also require respective nodes within the tree. Next, an example authentication tree is described to introduce the problems associated with static configuration.

Figure 5:
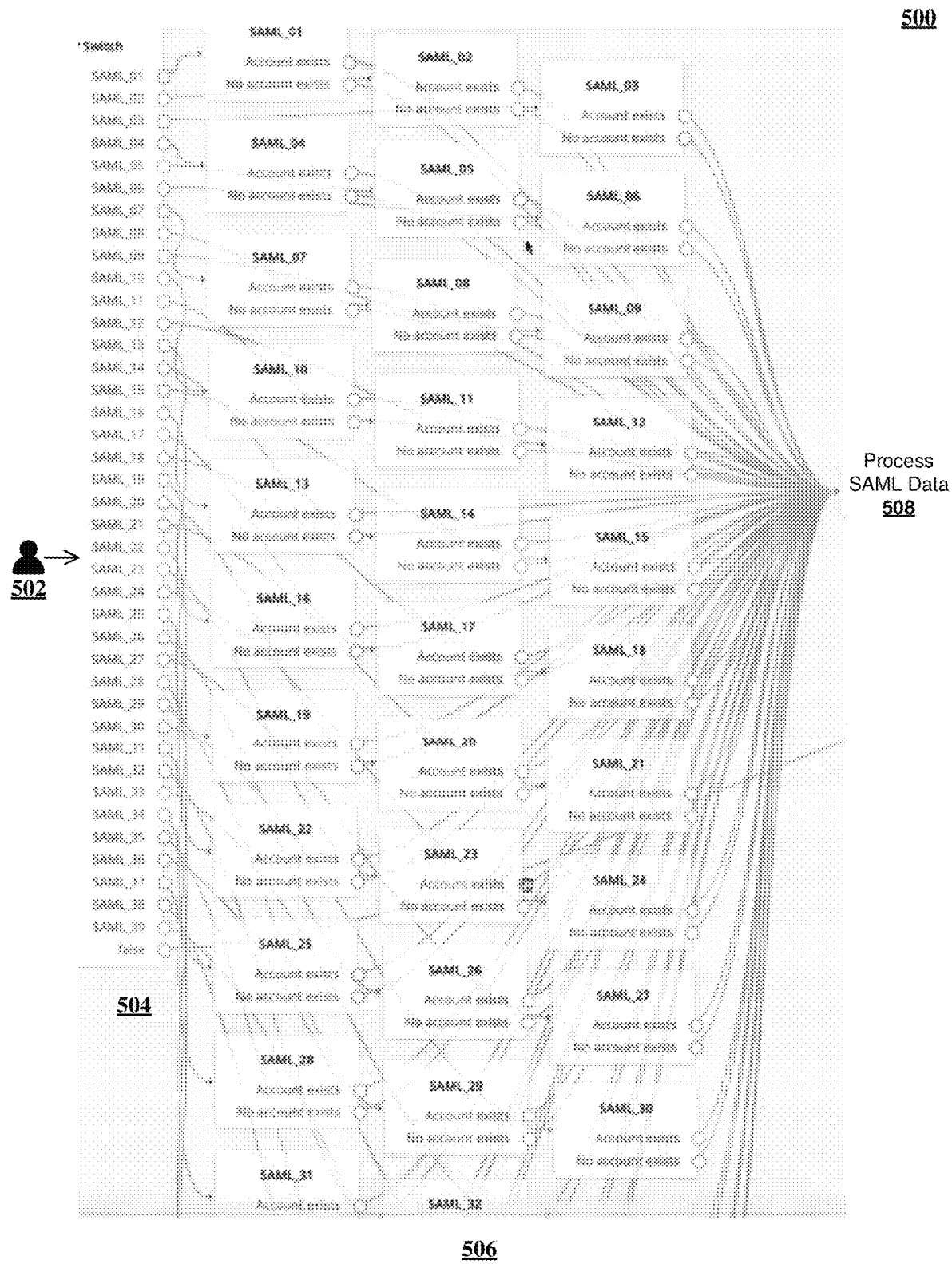
FIG. 5 illustrates a static authentication tree with a plurality of SAML nodes.

FIG. 5 illustrates a static authentication tree 500 with a plurality of SAML nodes. Authentication tree 500 comprises an IDP switch node 504 connected to a plurality of SAML nodes 506 respective for each SAML authentication method. Each individual SAML node determines if an account exists for user 502 for a particular SAML authentication method, and node 508 processes the plurality of outputs generated by the plurality of SAML nodes 506.

Numerous difficulties arise within the illustrated configuration of authentication tree 500, providing supporting evidence that a static authentication tree is an infeasible approach for certain authentication use cases. As the number of necessary authentication nodes increases and the tree becomes further encumbered with node connections, the accessibility of the tree for the administrator diminishes and the probability of error increases. A particular organization may have thousands of customers; thus, requiring thousands of authentication nodes. Thus, the problems illustrated by the model figure are exacerbated when scaled to real-world ecosystems. Additionally, certain customers will have special requests or requirements on their authentication journey to properly interact with their particular infrastructure. As complexity and size of an authentication tree increases, computational cost increases as well.

Static authentication trees also introduce risk of inappropriate access. If a particular customer leaves the platform, and a node is removed, the static and complex nature of the journey may risk introducing security flaws in the absence of investigation. Finally, the static nature of the nodes make customization for particular customers difficult.

Dynamic Configuration of Authentication Nodes

In contrast to authentication tree 500, the discussion now introduces examples of dynamically-configured authentication journeys that solve the aforementioned problems associated with a static authentication tree.

Figure 6:
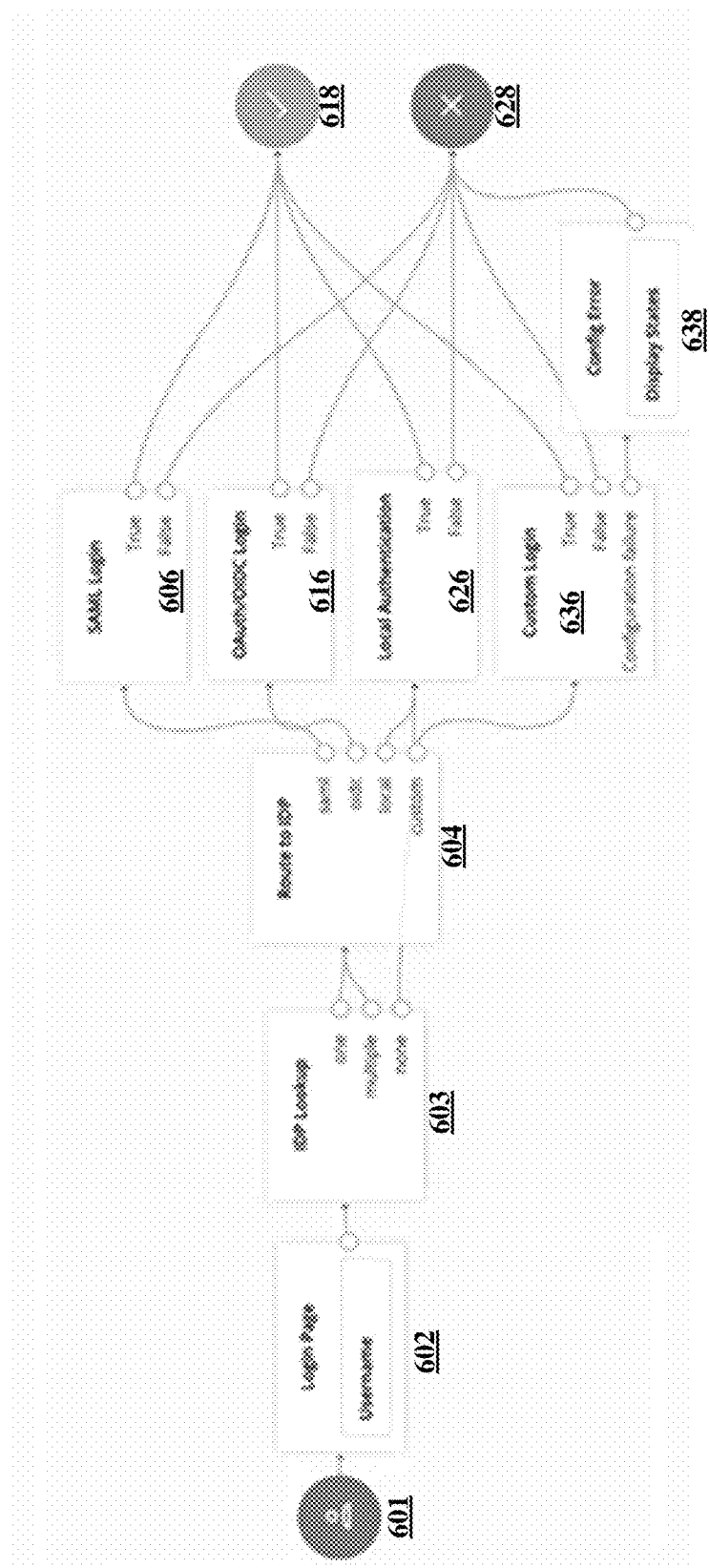
FIG. 6 illustrates an authentication tree including an identity provider lookup and route to identity provider nodes.

FIG. 6 illustrates an authentication tree including an identity provider lookup and route to identity provider nodes. A user 601 interacts with login node 602 to input their username which is provided to IDP lookup node 603. Upon discernment of the number of IDPs user 601 is registered with, Route to IDP node 604 is dynamically configured by the disclosed factory method via the editable script 272 so that node 604 switches to connection configurations for the appropriate authentication nodes, as determined by the username of user 601. The editable script parses the provided username and finds one or more appropriate IDPs. If none are found, local authentication is used. Possible authentication nodes include Inner Tree Evaluator nodes 606, 616, 626, and 636 wherein each node respectively routes to a SAML journey, OAuth journey, local authentication journey, or a custom journey configured by the customer.

Figure 7:
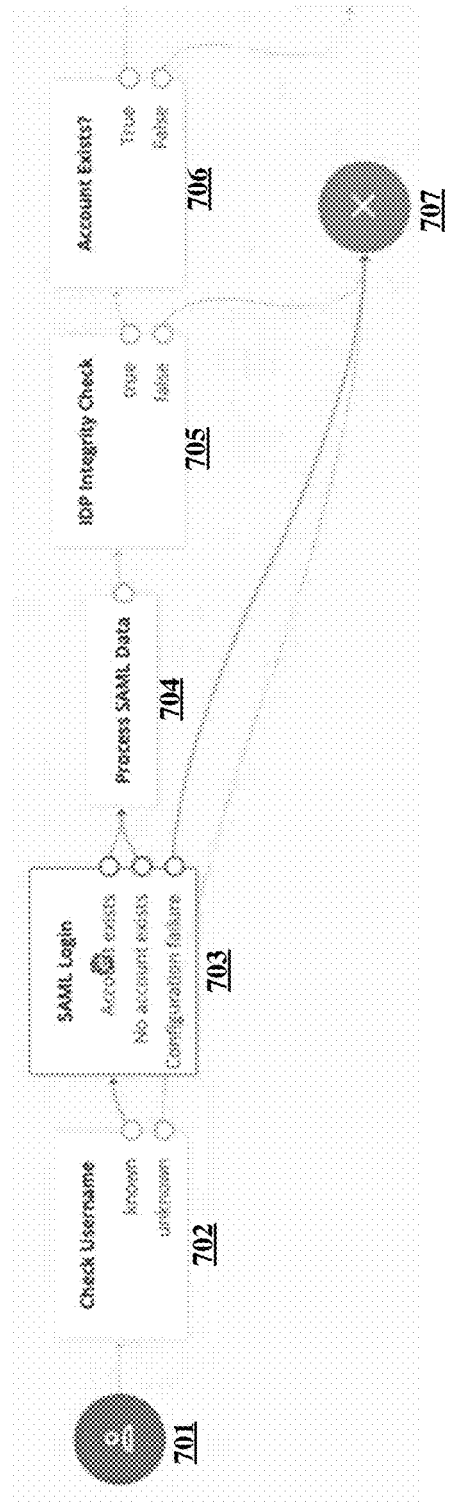
FIG. 7 illustrates an authentication tree including a routed SAML journey.

Following receival of a username and password for user 601, IDP lookup node 603 provides a Boolean data variable output informing Route to IDP node 604 if user 601 is registered with a particular IDP. If the result is True for the particular IDP, the alternative connection is configured to progress the journey to the appropriate Inner Tree Evaluator node. If authentication of the user at the respective node is successful, the journey results in authorization to access a particular API or GUI, represented by success terminal node 618. If risk is detected during the authentication journey by user 601 or the device used to authenticate user 601, the journey traverses to either step-up access (i.e., multi-factor authentication) or access is denied to user 601, as represented by failure terminal node 628. In implementations of the method disclosed comprising a customer-specific custom login 636, a configuration error 638 also traverses to failure terminal node 628. For example, the Inner Tree Evaluator node 606 points to a routed SAML journey FIG. 7 illustrates an authentication tree 700 including a routed SAML journey. More specifically, FIG. 7 illustrates an inner authentication tree 700 routed to from the outer authentication tree 600, including a routed SAML journey. The Check Username node 702 ascertains that user 701 provided a username previously accessible to the journey execution engine. If the username has been previously provided and is therefore "known", the authentication journey continues to Configuration Provider node 703 for SAML login. A user 701 provides a username to node 702. If the username is known to the customer, the authentication journey continues to Configuration Provider node 703 for SAML login. Authentication tree 700 represents a global SAML journey, configured as a single journey with a single SAML node 703 responsible for dynamically configuring the SAML connection by retrieving variable data from parameter data structure storage 266. The SAML response data resulting from the dynamic configuration and execution of the SAML Login node 703 is processed in step 704, injecting appropriate configuration parameters into the journey state, including attributes such as SAML assertion attributes and user ID. Thus, the receiving authentication node does not require redundant data parsing for relevant attributes. An IDP Integrity Check node 705 validates data being added to the authentication journey. Following validation, authentication node 706 identifies the asserted user 701 by the appropriate IDP and maps the asserted user identity to the local user identity. If any node within authentication tree 700 returns unknown data, configuration failure, or a suspected risk threat, the authentication journey is routed to failure node 707 to either step-up access (i.e., multi-factor authentication) or access is denied to user 601.

As shown in example authentication trees 600 and 700, the disclosed method of runtime configuration for authentication journeys provides an improvement upon static authentication trees in terms of flexibility (broader generalizability without the limitation of pre-runtime configuration), maintainability (helps with reducing the amount of central security configuration because the particular configuration can be delegated to the organization or the customer, and helps with the stability of service), and security (reduces the likelihood of the authentication journey encountering an outdated or malfunctioning authentication node, thus, reducing the risk of inappropriate access). Next, the discussion turns to further discuss the configuration parameters that guide runtime configuration of authentication trees.

Data Structures

Figure 8:
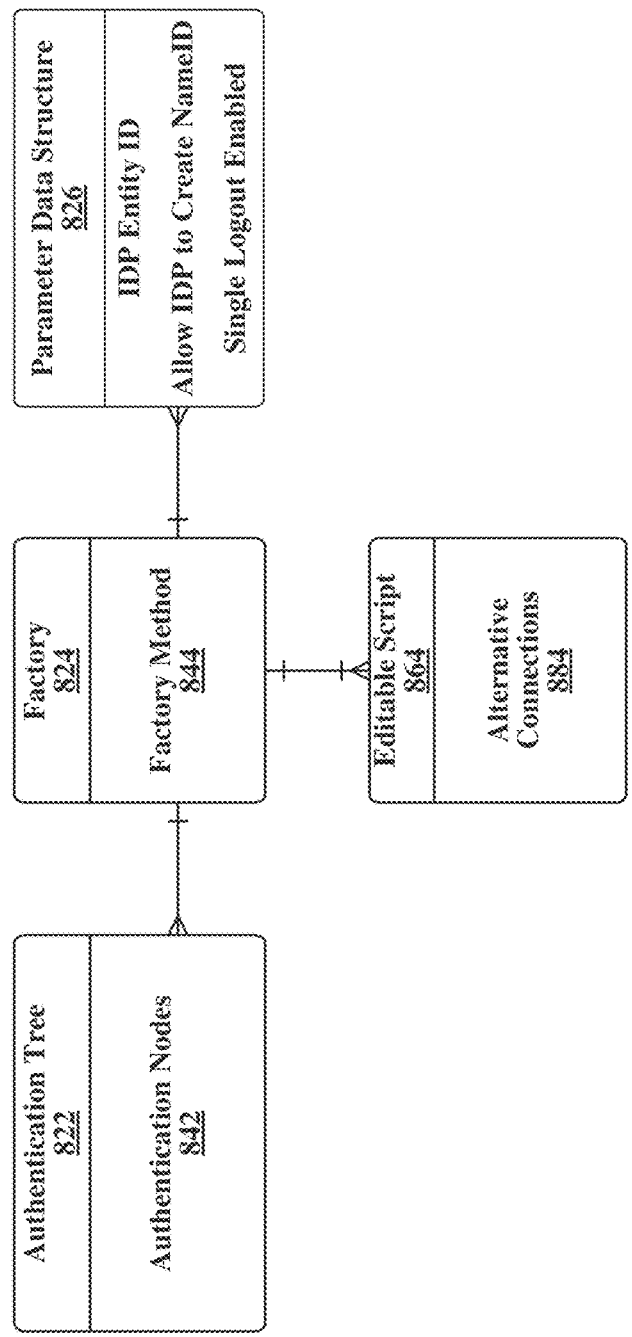
FIG. 8 shows an entity relationship diagram for components within a system for runtime configuration of authentication journeys.

FIG. 8 shows an entity relationship diagram for components within a system for runtime configuration of authentication journeys. An authentication tree 822 contains many authentication nodes 842. The authentication nodes 842 are modified by implementation of a factory method 844 by factory 824. Factory 824 has access to both parameter data structure 826 and editable script 862. Parameter data structure 826 contains a plurality of configuration parameters, such as an IDP Entity ID, a Boolean variable for allowing an IDP to create a Name ID, or a Boolean variable for enabling Single Logout. In addition to these examples, a wide range of additional configuration parameters exist for the configuration of a node within an authentication tree. The editable script 864 is responsible for dynamically configuring an authentication node 842 to meet the expected function during the execution of authentication tree 844 using information previously gathered as part of the tree execution to make decisions on configuring the node. Factory method 844 injects the appropriate parameters, as determined by user interaction with the tree in upstream nodes, into the editable script 864 to switch between alternative connections 884. As a result, authentication tree 822 is configured at the appropriate authentication nodes 842 to the correct alternative connection from 844, as guided by editable script 864 and facilitated by factory 824.

Computer System

Figure 9:
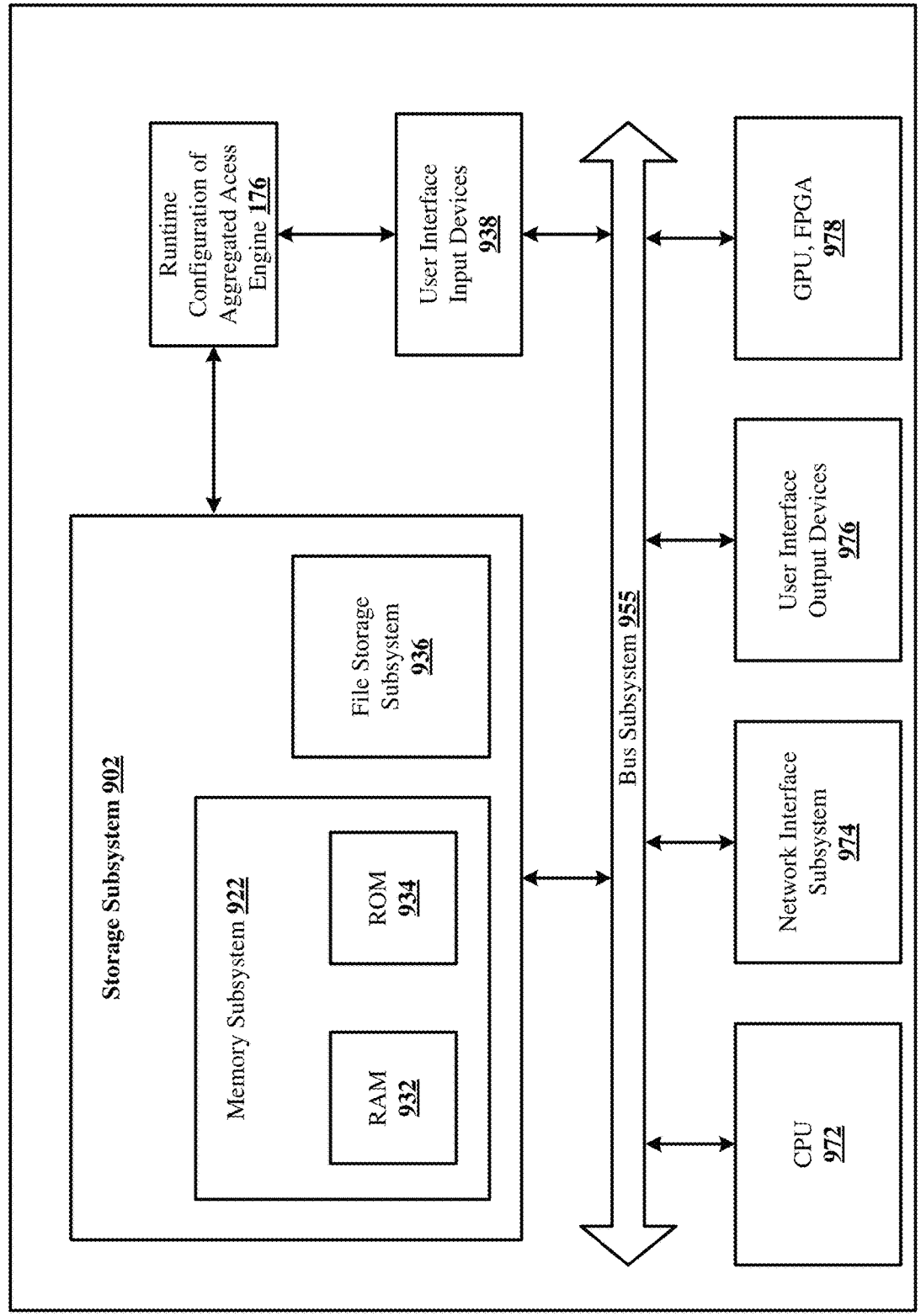
FIG. 9 shows an example computer system that can be used to implement the technology disclosed.

FIG. 9 is a simplified block diagram of a computer system 900 that can be used for role coalescence optimization. Computer system 900 includes at least one central processing unit (CPU) 972 that communicates with a number of peripheral devices via bus subsystem 955, and Runtime Configuration for Aggregated Access Engine 176, as described herein. These peripheral devices can include a storage subsystem 902 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems. Access Control System 155 is communicably linked to the storage subsystem 902 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 902 stores programming and data constructs that provide the functionality of some or all of the modules and methods described herein. Subsystem 978 can be graphics processing units (GPUs) or field-programmable gate arrays (FPGAs).

Memory subsystem 922 used in the storage subsystem 902 can include a number of memories including a main random-access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 902, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely distributed set of loosely networked computers, or any other data processing system or user device. Due to the ever changing nature of computers and networks, the description of computer system 900 depicted in FIG. 9 is intended only as a specific example for purposes of illustrating the preferred embodiments of the present invention. Many other configurations of computer system 900 are possible having more or fewer components than the computer system depicted in FIG. 9.

Technical Application Example

The following example includes scripted pseudocode for a particular JSON data store comprising configuration parameters set by an organization or an organization's customer that can be injected into editable script 272 via factory method 274.

| JSON script for Parameter Data Structure 826 | {<br>"samlConfig":<br>"allowCreate": false,<br>"authComparison": "EXACT",<br>"requestBinding": "HTTP_REDIRECT",<br>"binding": "HTTP:POST",<br>"forceAuthn": false,<br>"isPassive": false,<br>"nameIdFormat": "urn:oasis:names:tc:SAML:1.1:nameid-format:unspecified",<br>"sloEnabled": false, |
|---|---|

| | |
|---|---|
| | "idpEntityId": "https://idpidentityprovider.net/idpidentifieraddress/",<br>"metaAlias": "/alpha/iSPAzure",<br>"authnContextClassRef": [<br>  "urn:oasis:names:tc:SAML:2.0:ac:classes:PasswordProtectedTransport"<br>]<br>}, |
| Node Configuration State Variable within Editable Script 864 | config = nodeState.get('nodeConfig').asMap( ); |

The JSON script above contains a plurality of configuration parameters for a customer to be stored in parameter data structure 826. In response to receipt of user input indicating that the given parameters shown above for The Expanse are appropriate for the current authentication journey (e.g., a user ID and confirmation that the user intends to access The Expanse, as compared to other organizations the user may belong to), factory method 274 injects the appropriate configuration into the node configuration variable within editable script 864.

Particular Implementations

We describe some implementations and features for a method of runtime configuration of authentication journeys in the following discussion.

One implementation discloses a method for customers of an organization to dynamically configure authentication journeys used by the customer's users, to simplify authentication trees, and to delegate configuration to the customer's administrators, wherein an authentication tree implements an authentication journey. The authentication tree includes one or more authentication nodes connected by edges. The method includes the execution of a factory method that applies configuration parameters to an edible script and parameters used to access APIs. The factory method configures the editable script to switch among alternative connections among authentication nodes in the authentication tree, such that the factory method dynamically configures at least one field used by an authentication node in the authentication tree to access an API. The configuration parameters for the factory method are stored in a parameter data structure that stores a set of connection configurations for authentication nodes, and for an API accessed by at least one of the authentication nodes. The editable script then configures the authentication node within the authentication tree in response to a user invocation of the authentication journey.

Many implementations of the method further include applying the configuring to a customer instance of a legacy authentication node that, in a legacy implementation, was manually edited. In certain implementations, the customer's administrators configure the customer instance of the legacy authentication node by modifying data stored in the parameter data structure for use by the factory method, therefore also delegating the configuration of the parameter data structure to the customer's administrators. The authentication tree may be a legacy workflow or a workflow compatible with legacy workflows.

In some implementations, the method further includes receiving edits to the parameters used to access APIs from the customer's administrator and persisting the edits for use in response to the user invocation of the authentication journey. The alternative connections among authentication nodes in the authentication tree may represent alternatives of authentication methods, alternative registration, or alternative branding.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One implementation of the method further includes a unidirectional connection from an upstream authentication node to a downstream authentication node. The customer's user journeys across the authentication tree starting at a root authentication node of the authentication tree and traversing one or more downstream authentication nodes to a terminal authentication node. One implementation of the method further includes the authentication tree comprising one or more direct traversals created during execution of the authentication journey and the direct traversals created during execution of the authentication journey represent a nested authentication tree child within the authentication tree.

In some implementations of the method, the connection configuration is customized by the customer's user through configuration data stored in a data model.

Some implementations of the method further include the configuration data stored in the data model, which contains fields formatted in accordance with the fields in an authentication node of the authentication tree.

Other implementations of the technology disclosed further include a designated connection configuration that is unique to the nested authentication tree child within the authentication tree, and wherein the designated connection configuration is unique to the customer. The designated connection configuration is loaded into the authentication tree in response to the user invocation of an authentication node parent to the nested authentication tree child. The designated connection configuration is loaded into the nested authentication tree child.

Other implementations of the method further include a delegated administration structure that is associated with a database that supports configuring alternative connections between the authentication nodes and APIs accessed by the authentication nodes in response to a user invocation of the authentication journey.

Some implementations of the method further include accessing GUIs by the authentication nodes. The alternative connections are configured by the customer's users to traverse the API or the customer's users to traverse the GUI.

The alternative connections can use or customize a GUI or an API in a library that supports alternative authentication methods and alternative registration journeys. In one implementation, customization can change the connection configuration of a GUI, available downstream authentication nodes to traverse, and the connection configuration of available downstream authentication nodes.

In certain implementations of the method disclosed, the runtime configuration is saved in a cache to be accessed in future invocations of the authentication journey for the user. In other implementations, the runtime configuration is not cached and will undergo runtime configuration each time a user invokes the authentication journey. Other implementations include external services that provide a cookie, and the authentication node assigns data from the cookie for use in a downstream authentication node.

Other implementations of the disclosed technology described in this section can include a tangible non-transitory computer-readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method for a customer of an organization to perform configuration at runtime for authentication journeys used by users of the customer, to simplify authentication trees and to delegate configuration to administrators of the customer,
wherein an authentication tree implements an authentication journey, the authentication tree including authentication nodes and edges connecting the authentication nodes,
the computer-implemented method including:
configuring an editable script and an authentication node used in the authentication tree in response to a user invocation of the authentication journey by executing a factory method that applies configuration parameters to the editable script and to parameters used to access an API,
wherein the configuration parameters for the factory method are stored in a parameter data structure that stores a set of connection configurations for authentication nodes, and for the API accessed by at least one of the authentication nodes;
wherein the factory method configures the editable script to switch among alternative connections to authentication nodes in the authentication tree; and
wherein the factory method performs configuration at runtime of at least one parameter used by an authentication node in the authentication tree to access the API.

2. The computer-implemented method of claim 1, further including applying the configuring to a customer instance of a legacy authentication node that, in a legacy implementation, was manually edited.

3. The computer-implemented method of claim 1, further including delegating configuration of the parameter data structure to the administrators of the customer and the administrators of the customer configuring a customer instance of a legacy authentication node by modifying data stored in the parameter data structure for use by the factory method.

4. The computer-implemented method of claim 1, wherein the authentication tree is a legacy workflow or a workflow compatible with legacy workflows.

5. The computer-implemented method of claim 1, further including receiving edits to the parameters used to access the API from an administrator of the customer and persisting the edits for use in response to the user invocation of the authentication journey.

6. The computer-implemented method of claim 1, wherein the alternative connections among authentication nodes in the authentication tree represent alternatives of authentication methods, alternative registration, or alternative branding.

7. The computer-implemented method of claim 1, further including a user of the customer journeying across the authentication tree starting at a root authentication node of the authentication tree and traversing one or more downstream authentication nodes to a terminal authentication node.

8. The computer-implemented method of claim 7, wherein the authentication tree comprises one or more direct traversals created during execution of the authentication journey and the one or more direct traversals created during execution of the authentication journey represent a nested authentication tree child wrapped by an authentication node parent within the authentication tree.

9. The computer-implemented method of claim 8, wherein a connection configuration from the set of connection configurations is customized by the user of the customer through configuration data stored in a data model.

10. The computer-implemented method of claim 9, wherein a designated connection configuration is unique to a nested authentication tree child within the authentication tree, and wherein the designated connection configuration is unique to the customer.

11. The computer-implemented method of claim 10, wherein the designated connection configuration is loaded into the nested authentication tree child in response to the user invocation of an authentication node parent to the nested authentication tree child.

12. The computer-implemented method of claim 1, further including a delegated administration structure, wherein the delegated administration structure is associated with a database that supports configuring alternative connections between the authentication nodes and APIs accessed by the authentication nodes in response to a user invocation of the authentication journey.

13. The computer-implemented method of claim 1, wherein the alternative connections can use or customize a GUI or an API in a library that supports alternative authentication methods and alternative registration journeys.

14. The computer-implemented method of claim 1, wherein external services provide a cookie, and wherein the authentication node assigns data from the cookie for use in a downstream authentication node.

15. A tangible non-transitory computer readable storage media, including program instructions loaded into memory that, when executed on processors cause the processors to implement a method of performing configuration at runtime for authentication journeys used by users of a customer, to simplify authentication trees and to delegate configuration to administrators of the customer,
 wherein an authentication tree implements an authentication journey, the authentication tree including authentication nodes and edges connecting the authentication nodes,
 the method including:
 configuring an editable script and an authentication node used in the authentication tree in response to a user invocation of the authentication journey by executing a factory method that applies configuration parameters to the editable script and to parameters used to access an API,
  wherein the configuration parameters for the factory method are stored in a parameter data structure that stores a set of connection configurations for authentication nodes, and for the API accessed by at least one of the authentication nodes;
  wherein the factory method configures the editable script to switch among alternative connections to authentication nodes in the authentication tree; and
  wherein the factory method performs configuration at runtime for at least one parameter used by an authentication node in the authentication tree to access the API.

16. The tangible non-transitory computer readable storage media of claim 15, further including delegating configuration of the parameter data structure to the administrators of the customer and the administrators of the customer configuring a customer instance of a legacy authentication node by modifying data stored in the parameter data structure for use by the factory method.

17. The tangible non-transitory computer readable storage media of claim 15, wherein the authentication tree is a legacy workflow or a workflow compatible with legacy workflows.

18. The tangible non-transitory computer readable storage media of claim 15, further including receiving edits to the parameters used to access APIs or GUIs from an administrator of the customer and persisting the edits for use in response to the user invocation of the authentication journey.

19. The tangible non-transitory computer readable storage media of claim 15, wherein a connection configuration from the set of connection configurations is customized by a user of the customer through configuration data stored in a data model.

20. A system for performing configuration at runtime for authentication journeys used by users of a customer, to simplify authentication trees and to delegate configuration to administrators of the customer, the system including a processor, memory coupled to the processor and program instructions from the tangible non-transitory computer readable storage media of claim 15 loaded into the memory.

21. The system of claim 20, further including applying the configuring to a customer instance of a legacy authentication node that, in a legacy implementation, was manually edited.

22. The system of claim 20, further including a delegated administration structure, wherein the delegated administration structure is associated with a database that supports configuring alternative connections between the authentication nodes and APIs accessed by the authentication nodes in response to a user invocation of the authentication journey.

23. The system of claim 20, wherein the alternative connections among authentication nodes in the authentication tree represent alternatives of authentication methods, alternative registration, or alternative branding.

* * * * *